United States Patent
Ro et al.

(10) Patent No.: US 9,063,386 B2
(45) Date of Patent: Jun. 23, 2015

(54) LIQUID CRYSTAL DISPLAY INCLUDING A THIN FILM TRANSISTOR SUBSTRATE COMPRISING OPEN/SHORT PADS OVERLAPPED TFTS AND REPAIR LINES

(71) Applicant: Samsung Display Co., Ltd., Yongin, Gyeonggi-Do (KR)

(72) Inventors: Sungin Ro, Hwaseong-si (KR); Seunghyun Park, Seoul (KR); Dong Gun Oh, Osan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 230 days.

(21) Appl. No.: 13/875,823

(22) Filed: May 2, 2013

(65) Prior Publication Data

US 2014/0184969 A1    Jul. 3, 2014

(30) Foreign Application Priority Data

Jan. 2, 2013    (KR) .................. 10-2013-0000290

(51) Int. Cl.
    *G02F 1/1333*    (2006.01)
    *G02F 1/1345*    (2006.01)
    *G02F 1/1362*    (2006.01)

(52) U.S. Cl.
    CPC ...... *G02F 1/136286* (2013.01); *G02F 1/13458* (2013.01); *G02F 1/136259* (2013.01)

(58) Field of Classification Search
    USPC ..................... 349/40, 54, 149–152
    See application file for complete search history.

(56) References Cited

U.S. PATENT DOCUMENTS

| | | | |
|---|---|---|---|
| 5,684,547 A | 11/1997 | Park et al. | |
| 5,969,779 A | 10/1999 | Kim et al. | |
| 6,380,992 B1 | 4/2002 | Lee | |
| 6,429,908 B1 | 8/2002 | Lim | |
| 7,358,534 B2 * | 4/2008 | Park | 257/72 |
| 7,372,514 B2 * | 5/2008 | Matsumoto et al. | 349/55 |
| 7,499,122 B2 * | 3/2009 | Lai et al. | 349/55 |
| 8,026,993 B2 * | 9/2011 | Liao | 349/54 |

FOREIGN PATENT DOCUMENTS

| | | |
|---|---|---|
| JP | 10-170946 | 6/1998 |
| JP | 2005-208611 | 8/2005 |
| KR | 10-2002-0076936 | 10/2002 |
| KR | 10-2003-0008407 | 1/2003 |
| KR | 10-0477129 | 3/2005 |
| KR | 10-2006-0066355 | 6/2006 |
| KR | 10-2008-0017591 | 2/2008 |
| KR | 10-2008-0110378 | 12/2008 |

* cited by examiner

*Primary Examiner* — Huyen Ngo
(74) *Attorney, Agent, or Firm* — Innovation Counsel LLP

(57) ABSTRACT

A thin film transistor substrate a display area that includes pixels connected to gate lines and data lines crossing the gate lines, a non-display area disposed adjacent to the display area, data pads disposed in the non-display area and each being connected to a first end of a corresponding data line of the data lines, first transistors disposed in the non-display area and each being connected to a second end of the corresponding data line of the data lines, OS pads connected to the second end of the data lines, and repair lines disposed in the non-display area along a vicinity of the display area and arranged while interposing the first transistors therebetween. The OS pads are overlapped with the first transistors and the repair lines.

20 Claims, 7 Drawing Sheets

LIQUID CRYSTAL DISPLAY INCLUDING A THIN FILM TRANSISTOR SUBSTRATE COMPRISING OPEN/SHORT PADS OVERLAPPED TFTS AND REPAIR LINES

CROSS-REFERENCE TO RELATED APPLICATION

This U.S. non-provisional patent application claims priority to and benefit of Korean Patent Application No. 10-2013-0000290 filed on Jan. 2, 2013, the contents of which are incorporated herein by reference.

BACKGROUND

1. Field of the Invention

The present invention relates to a thin film transistor substrate and a liquid crystal display that includes the thin film transistor substrate.

2. Description of the Related Art

In general, a liquid crystal display includes a display panel for displaying an image and a backlight unit for supplying light to the display panel. The display panel includes a thin film transistor substrate in which pixels are arranged in a matrix form, a color filter substrate overlapping the thin film transistor substrate, and a liquid crystal layer interposed between the thin film transistor substrate and the color filter substrate.

The thin film transistor substrate includes gate lines, data lines insulated from the gate lines and crossing the gate lines, and thin film transistors each being connected to a corresponding gate line of the gate lines and a corresponding data line of the data lines. Each pixel may receive a pixel voltage through a corresponding thin film transistor of the thin film transistors. An arrangement of liquid crystal molecules of the liquid crystal layer may be changed in accordance with the pixel voltage, and a transmittance of the light transmitted through the liquid crystal layer may change according to the arrangement of the liquid crystal molecules, thereby displaying a desired image.

Various inspections are required to detect defects when the display panel is manufactured. For example, the inspections may include an open/short test and a visual inspection.

The open/short test is applied to detect opens and shorts on the data lines formed on the thin film transistor substrate. For each data line of the data lines, the open/short test is performed by applying a test signal to one end of the data line and detecting the test signal from the other end of the data line. If a data line is open, the open data line is welded to a repair line. A data voltage (or data signal) is transmitted through the repair line to at least a portion of the open data line.

The visual inspection is performed by applying an inspection signal having a constant voltage level to the gate lines and the data lines, which are connected to the pixels of the thin film transistor substrate, and observing a resistance image (or resistance profile).

SUMMARY

Embodiments of the present invention may be related to a thin film transistor substrate with an effectively utilized non-display area.

Embodiments of the present invention may be related to a liquid crystal display having the thin film transistor substrate.

One or more embodiments of the invention may be related to a thin film transistor substrate including a display area that includes the following elements: a plurality of pixels connected to gate lines and data lines crossing the gate lines, a non-display area disposed adjacent to the display area, a plurality of data pads disposed in the non-display area and each being connected to a first end of a corresponding data line of the data lines, a plurality of first transistors disposed in the non-display area and each being connected to a second end of the corresponding data line of the data lines, a plurality of OS pads connected to the second end of the data lines, and a plurality of repair lines disposed in the non-display area along a vicinity of the display area and arranged while interposing the first transistors therebetween. The OS pads overlap the first transistors and the repair lines.

The non-display area includes a first non-display area disposed adjacent to a lower side of the display area and including the data pads disposed therein, a second non-display area disposed adjacent to an upper side of the display area and including the OS pads and the first transistors disposed therein, a third non-display area disposed adjacent to a right side of the display area, and a fourth non-display area disposed adjacent to a left side of the display area.

The data lines include first data lines corresponding to odd-numbered data lines of the data lines and second data lines corresponding to even-numbered data lines of the data lines, and the second data lines extend longer than the first data lines in the second non-display area.

The repair line includes a first repair line and a second repair line disposed at a position outer than the first repair line, and the first transistors are disposed between the first repair line and the second repair line.

The thin film transistor substrate further includes a first test gate line disposed between the first and second repair lines in the second non-display area to be connected to the first transistors, a first switching pad connected to the first test gate line, and a plurality of first test pads connected to the first transistors. The first transistors are divided into first groups respectively corresponding to the first test pads, and the first transistors arranged in the same first group are commonly connected to a corresponding first test pad of the first test pads.

Each of the first transistors includes a gate electrode connected to the first test gate line, a drain electrode connected to the corresponding data line, and a source electrode connected to the corresponding first test pad, and the source electrodes of the first transistors arranged in the same first group are commonly connected to the corresponding first test pad.

The first data lines overlap the first test gate line and the first repair line and the second data lines overlap the first repair line, the first test gate line, and the second repair line.

The OS pads connected to the second end of the first data lines overlap the first repair line and the first test gate line, and the OS pads connected to the second end of the second data lines overlap the first test gate line and the second repair line.

The thin film transistor substrate further includes a gate driver disposed in the third non-display area to be connected to the gate lines, a plurality of second transistors each connected to a corresponding gate line of the gate lines in the fourth non-display area, a second switching pad connected to the second transistors, and a plurality of second test pads connected to the second transistors, wherein the second transistors are divided into second groups respectively corresponding to the second test pads. The second transistors arranged in the same second group are commonly connected to a corresponding second test pad of the second test pads.

Each of the second transistors includes a gate electrode connected to the second switching pad, a drain electrode connected to the corresponding gate line, and a source electrode connected to the corresponding second test pad, and the source electrodes of the second transistors arranged in the same second group are commonly connected to the corresponding second test pad.

One or more embodiments of the invention may be related to a liquid crystal display that includes the following elements: a thin film transistor substrate that includes gate lines applied with gate signals, data lines applied with data voltages and crossing the gate lines, pixels connected to the gate lines and the data lines, a gate driver that applies the gate signals to the pixels, a data driver that applies the data voltages to the pixels, a color filter substrate facing the thin film transistor substrate, and a liquid crystal layer interposed between the thin film transistor substrate and the color filter substrate. The thin film transistor substrate includes a display area that includes the pixels, a non-display area disposed adjacent to the display area, a plurality of data pads disposed in the non-display area and each being connected to a first end of a corresponding data line of the data lines and the data driver, a plurality of first transistors disposed in the non-display area and each being connected to a second end of the corresponding data line of the data lines, a plurality of OS pads connected to the second end of the data lines, and a plurality of repair lines disposed in the non-display area along a vicinity of the display area and arranged while interposing the first transistors therebetween. The OS pads overlap the first transistors and the repair lines.

According to the above, the thin film transistor substrate and the liquid crystal display having the thin film transistor substrate with an effectively and efficiently utilized non-display area. Advantageously, the size of the thin film transistor substrate and/or the size of the liquid crystal display may be minimized.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Hereinafter, the present invention will be explained in detail with reference to the accompanying drawings.

Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

In this application, "short" may mean "short circuit"; "open" may mean "open circuit".

Figure 1:
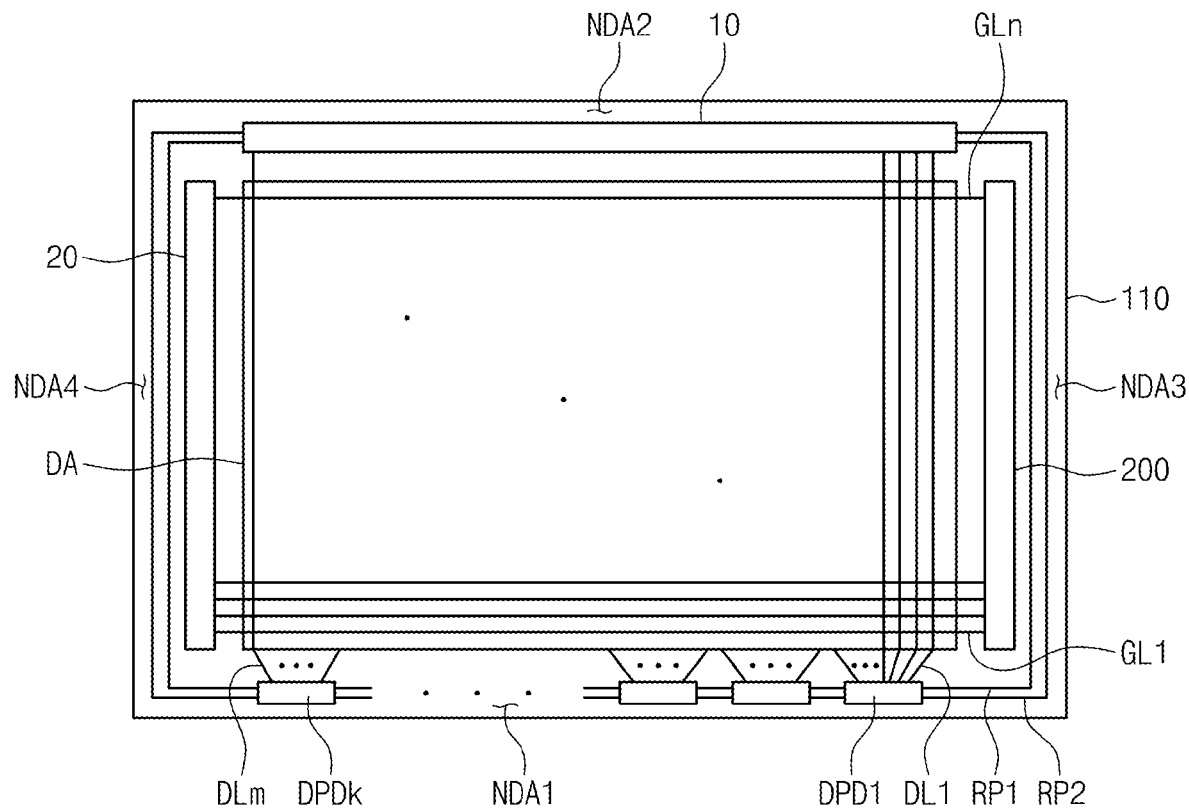
FIG. 1 is a plan view illustrating a thin film transistor substrate according to one or more embodiments of the present invention.

FIG. 1 is a plan view illustrating a thin film transistor substrate 110 according to one or more embodiments of the present invention.

Referring to FIG. 1, the thin film transistor substrate 110 includes a plurality of gate lines GL1 to GLn, a plurality of data lines DL1 to DLm, a first test part 10, a second test part 20, and a plurality of repair lines, such as repair lines RP1 and RP2. The thin film transistor substrate 110 includes a display area DA and non-display areas NDA1, NDA2, NDA3, and NDA4 disposed in the vicinity of the display area DA and surrounding the display area DA.

The gate lines GL1 to GLn are insulated from the data lines DL1 to DLm and cross the data lines DL1 to DLm in the display area DA of the thin film transistor substrate 110. Each of the m and the n represents an integer (or natural number) greater than zero (0). Although not illustrated in FIG. 1, the thin film transistor substrate 110 includes a plurality of pixels disposed in the display area DA and arranged in areas defined by the gate lines GL1 to GLn and the data lines DL1 to DLm. The pixels are arranged in n rows by m columns.

The non-display area NDA1, NDA2, NDA3, and NDA4 include a first non-display area NDA1 disposed adjacent to (and substantially parallel to) a lower side of the display area DA, a second non-display area NDA2 disposed adjacent to (and substantially parallel to) an upper side of the display area DA, a third non-display area NDA3 disposed adjacent to (and substantially parallel to) a right side of the display area DA, and a fourth non-display area NDA4 disposed adjacent to (and substantially parallel to) a left side of the display area DA.

A plurality of data pad parts DPD1 to DPDk is disposed in the first non-display area NDA1. The k is an integer (or natural number) greater than zero (0) and smaller than or no greater than m. The data lines DL1 to DLm extend in (or into) the first non-display area NDA1 to be electrically connected to the data pad parts DPD1 to DPDk. Each of the data pad parts DPD1 to DPDk is connected to several data lines.

The data pad parts DPD1 to DPDk are connected to source driver chips (illustrated in FIG. 8), respectively. The source driver chips apply data voltages to the data pad parts DPD1 to DPDk. The data voltages are applied to the pixels through the data lines DL1 to DLm, which are connected to the data pad parts DPD1 to DPDk. The connection between the source driver chips and the data pad parts DPD1 to DPDk will be described in detail with reference to FIG. 8.

The first test part 10 is disposed in the second non-display area NDA2. The data lines DL1 to DLm extend in the second non-display area NDA2 to be electrically connected to the first test part 10. When an open/short test is performed, the first test part 10 applies a first test signal to the data lines DL1 to DLm. The data lines DL1 to DLm are tested whether they are open (not conductive end-to-end) and/or short (conductive end-to-end) using the first test signal.

The repair lines include a first repair line RP1 and a second repair line RP2 located at a position outer than the first repair line RP1, wherein the first repair line RP1 is disposed between the display area DA and the second repair line RP2 in the plan view of the thin film transistor substrate 110. The repair lines RP1 and RP2 are disposed in the non-display areas NDA1 to NDA4 arranged along a vicinity of (and surrounding) the display area DA. The repair lines RP1 and RP2 overlap the data pad parts DPD1 to DPDk and the first test part 10. The repair lines RP1 and RP2 are formed on the same layer as the gate lines GL1 to GLn through the same process in which the gate lines GL1 to GLn are formed.

The open data line(s) may be detected by the open/short test. The portion of the data pad part that is (electrically) connected to an open data line is welded (e.g., using a laser) with a portion of one of the repair lines that overlaps the portion of the data pad part connected to the open data line. The portion of the first test part that is (electrically) connected to the open data line is welded (e.g., using a laser) with a portion of one of the repair lines (e.g., a portion of the repair line welded with the data pad part) that overlaps the portion of the first test part connected to the open data line.

A gate driver 200 is disposed in the third non-display area NDA3 and is configured to apply gate signals to the pixels. The gate driver 200 may include an amorphous silicon TFT gate driver circuit (ASG). The gate lines GL1 to GLn extend in (or into) the third non-display area NDA3 to be electrically connected to the gate driver 200. The gate driver 200 may apply the gate signals to the pixels through the gate lines GL1 to GLn, and the gate signals may be sequentially applied to the pixels row by row.

The second test part 20 is disposed in the fourth non-display area NDA4. The gate lines GL1 to GLn extend in (or into) the fourth non-display area NDA4 to be electrically connected to the second test part 20.

When a visual test is performed, a second test signal is applied to the gate lines GL1 to GLn through the second test part 20. In addition, a third test signal is applied to the data lines DL1 to DLm through the first test part 10.

The second test signal applied to the gate lines GL1 to GLn and the third test signal applied to the data lines DL1 to DLm may enable the display panel to form a resistance image in the display area DA of the thin film transistor substrate 110. The visual test is performed by observing the resistance image appeared in the display area DA of the thin film transistor substrate 110 using a test camera and comparing the observed resistance image with a predetermined resistance image. That is, after the second and third test signals have been applied, the shorts or the opens between the gate liens GL1 to GLn, the data lines DL1 to DLm, and/or the pixels of the display area DA are detected using the test camera.

Figure 2:
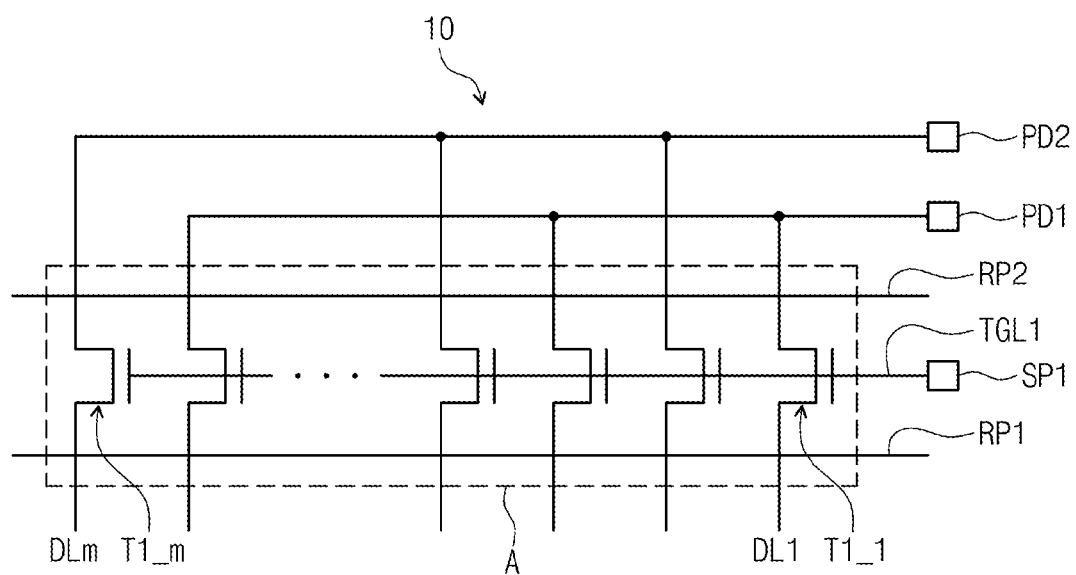
FIG. 2 is a circuit diagram illustrating a first test part illustrated in FIG. 1.
Figure 3:
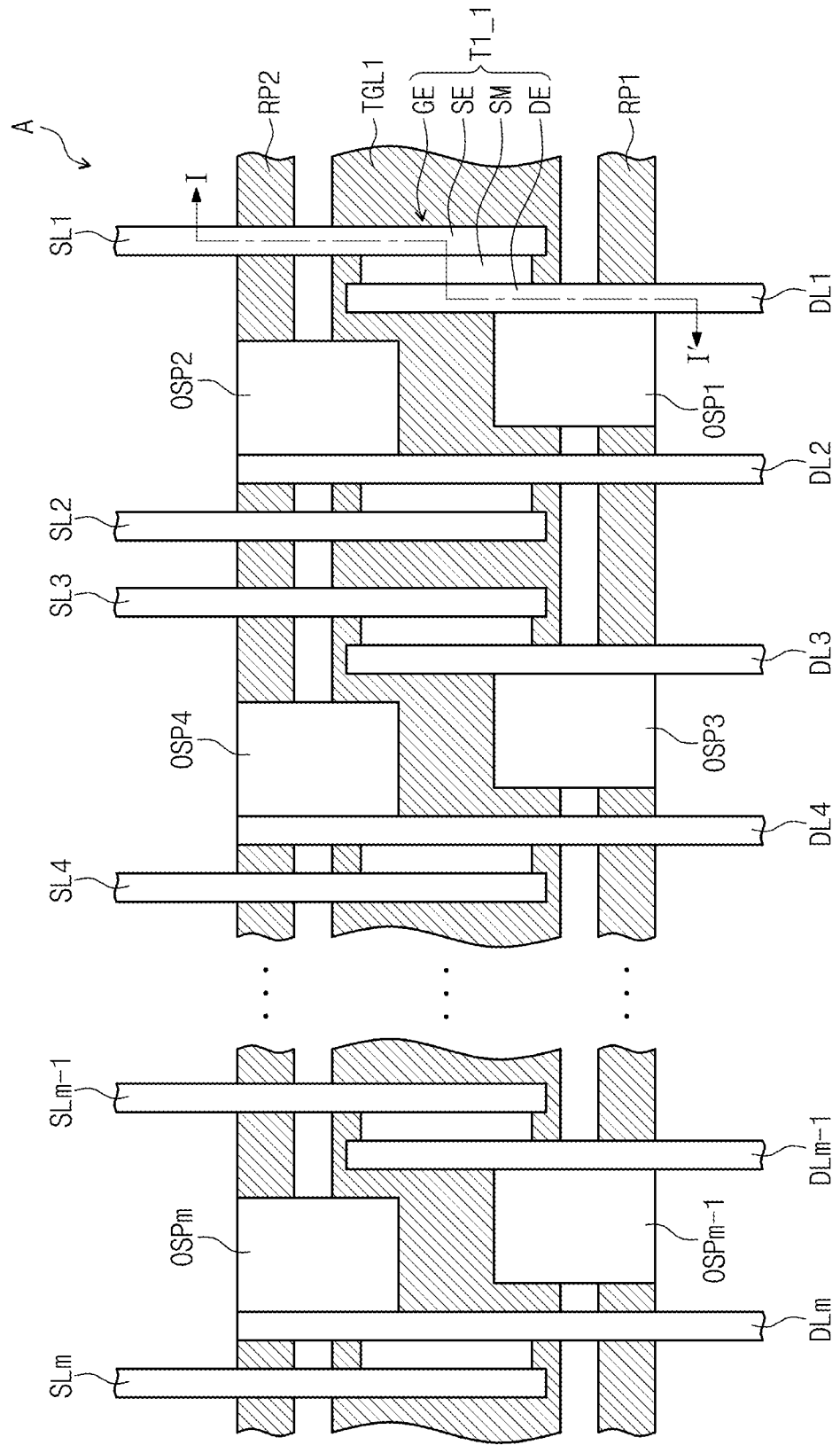
FIG. 3 is a layout illustrating a first area illustrated in FIG. 2.
Figure 4:
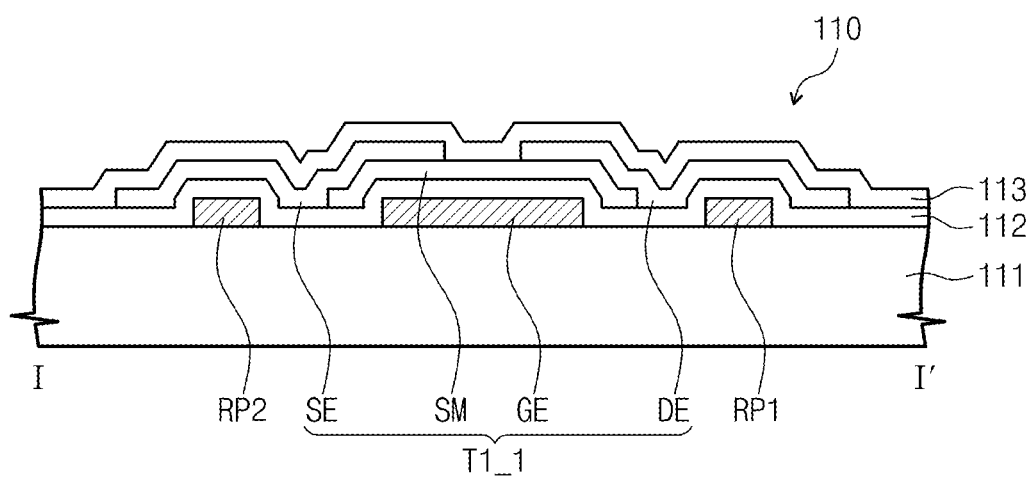
FIG. 4 is a cross-sectional view taken along a line I-I' indicated in FIG. 3.
Figure 5:
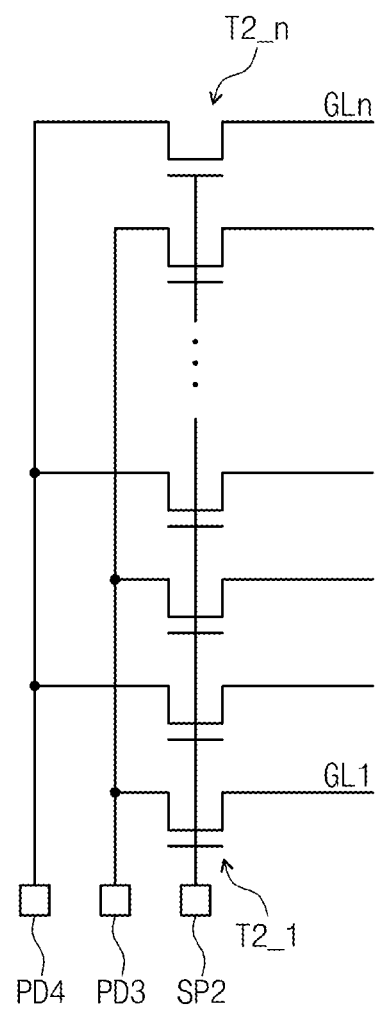
FIG. 5 is a circuit diagram illustrating a second test part illustrated in FIG. 1.

FIG. 2 is a circuit diagram illustrating the first test part 10 illustrated in FIG. 1, FIG. 3 is a layout illustrating a first area A illustrated in FIG. 2, FIG. 4 is a cross-sectional view taken along a line I-I' indicated in FIG. 3, and FIG. 5 is a circuit diagram illustrating the second test part 10 illustrated in FIG. 1.

Referring to FIGS. 2 and 3, the first test part 10 includes a plurality of first-category test transistors (or first test transistors, for conciseness) T1_1 to T1_m, a first switching pad SP1, a plurality of first-category test pads (or first test pads, for conciseness, including test pads PD1 and PD2), a plurality of open/short pads (or OS pads, for conciseness) OSP1 to OSPm, and a first test gate line TGL1. The OS pads are electrically conductive pads used for the open/short test of the data lines and are configured for transmitting data signals.

The first test gate line TGL1 extends in a row direction and is electrically connected to (each gate electrode of the) gate electrodes of the first test transistors T1_1 to T1_m. In one or more embodiments, the first test gate line TGL1 forms (and/or includes) the gate electrodes GE of the first test transistors T1_1 to T1_m. The first test gate line TGL1 is electrically connected to the first switching pad SP1. The first test gate line TGL1 is formed on the same layer (of the same material) as the repair lines RP1 and RP2 and is formed substantially simultaneously with the repair lines RP1 and RP2.

Drain electrodes of the first test transistors T1_1 to T1_m are electrically connected to the data lines DL1 to DLm, respectively. In one or more embodiments, the data lines DL1 to DLm extend to form the drain electrodes DE of the first test transistors T1_1 to T1_m.

The first repair line RP1 and the second repair line RP2 are substantially parallel to each other with the first test gate line TGL1 being disposed between the first repair line RP1 and the second repair line RP2. In one or more embodiments, the first repair line RP1 is disposed between a lower portion of the first test gate line TGL1 and a lower edge of the first test part 10, and the second repair line RP2 is disposed between an upper portion of the first test gate line TGL1 and an upper edge of the first test part 10.

The data lines DL1 to DLm include first-group data lines (or first data lines, for conciseness) DL1, DL3, . . . , and DLm-1 respectively representing odd-numbered data lines DL1, DL3, . . . , and DLm-1 and include second-group data lines (or second data lines, for conciseness) DL2, DL4, . . . , and DLm respectively representing even-numbered data lines DL2, DL4, . . . , and DLm. The first data lines DL1, DL3, . . . , and DLm-1 may be shorter than the second data lines DL2, DL4, . . . , and DLm in the second non-display area NDA2.

The first data lines DL1, DL3, . . . , and DLm-1 extend to overlap the first repair line RP1 and the first test gate line TGL1. The second data lines DL2, DL4, . . . , and DLm extend to overlap the first repair line RP1, the first test gate line TGL1, and the second repair line RP2.

In the first test part 10, each of the data lines DL1 to DLm is electrically connected to a corresponding OS pad of the OS pads OSP1 to OSPm. In one or more embodiments, the OS pads OSP1 to OSPm include first-group OS pads (or first OS pads, for conciseness) OSP1, OSP3, . . . , and OSPm-1 respectively representing odd-numbered OS pads OSP1, OSP3, . . . , and OSPm-1 and include second-group PS pads (or second OS pads, for conciseness) OSP2, OSP4, . . . , and OSPm respectively representing even-numbered OS pads OSP2, OSP4, . . . , and OSPm.

Each of the first OS pads OSP1, OSP3, . . . , and OSPm-1 is electrically connected to a corresponding first data line of the first data lines DL1, DL3, . . . , and DLm-1 and overlaps both the first repair line RP1 and the first test gate line TGL1. Each of the second OS pads OSP2, OSP4, . . . , and OSPm is electrically connected to a corresponding second data line of the second data lines DL2, DL4, . . . , and DLm and overlaps both the second repair line RP2 and the first test gate line TGL1.

Each of the first test transistors T1_1 to T1_m is electrically connected to one of the first test pads PD1 and PD2. The source electrode SE of each of the first test transistors is electrically connected to the corresponding first test pad PD1 or PD2. In one or more embodiments, the first test transistors T1_1 to T1_m include a first sub-group (which is electrically connected to the test pad PD1) and a second sub-group (which is electrically connected to the test pad PD2). The first sub-group may include the odd-numbered transistors T1_1, T1_3, ..., and T1_m-1 of the first test transistors T1_1 to T1_m, and the second sub-group may include the even-numbered transistors T1_2, T1_4, ..., and T1_m of the first test transistors T1_1 to T1_m.

The first test pads PD1 and PD2 include a test pad PD1 (which is electrically connected to the first sub-group) and a test pad PD2 (which is electrically connected to the second sub-group). The source electrodes SE of the first test transistors T1_1, T1_3, ..., and T1_m-1 (i.e. the first sub-group) are electrically connected to the test pad PD1, and the source electrodes SE of the first test transistors T1_2, T1_4, ..., and T1_m (i.e., the second sub-group) are electrically connected to the test pad PD2.

In one or more embodiments, the source electrodes SE of the first test transistors T1_1 to T1_m are formed by extending source lines SL1 to SLm to overlap the drain electrodes DE, which are portions of or are electrically connected to the data lines DL1 to DLm, in the row direction. The source lines SL1 to SLm are configured to transmit a first signal (or data line test signal) and overlap the second repair line RP2 and the first test gate line TGL1. Among the source lines SL1 to SLm, each of the odd-numbered source lines SL1, SL3, ..., and SLm-1 is electrically connected to the first pad PD1, and each of the even-numbered source lines SL2, SL4, ..., and SLm is electrically connected to the second pad PD2.

Each of the drain electrodes DE of the first test transistors T1_1, T1_3, ..., and T1_m-1 of the first sub-group is connected to a corresponding first data line of the first data lines DL1, DL3, ..., and DLm-1. Each of the drain electrodes DE of the first test transistors T1_2, T1_4, ..., and T1_m of the second sub-group is connected to a corresponding second data line of the second data lines DL2, DL4, ..., and DLm.

In one or more embodiments, as illustrated in FIGS. 2 and 3, the first test transistors include two sub-groups respectively connected to two first test pads PD1 and PD2. In one or more embodiments, the first test transistors T1_1 to T1_m may be divided into two or more sub-groups respectively connected to two or more first test pads.

In one or more embodiments, the first test transistors T1_1 to T1_m may include a first sub-group, a second sub-group, and a third sub-group respectively and electrically connected to three first test pads. In one or more embodiments, test transistors of the three sub-groups may be alternately arranged.

In one or more embodiments, all of the first test transistors T1_1 to T1_m may be electrically connected to a same first test pad.

FIG. 4 illustrates a structure of a first test transistor T1_1 of the first test transistors T1_1 to T1_m. The other first test transistors, i.e., the first test transistor T1_2 to T1_m, may have structures and functions that are the same as or analogous to the structure and function of the first test transistor T1_1.

Referring to FIG. 4, the gate electrode GE of the first test transistor T1_1 is disposed on a first base substrate 111 of the thin film transistor substrate HO. As illustrated in FIGS. 3 and 4, the gate electrode GE may be a portion of the first test gate line TGL1 and may be disposed between the repair lines RP1 and RP2, which also are disposed on the first base substrate 111. A gate insulating layer 112 is disposed on the first base substrate 111 to cover the gate electrode GE, the first repair line RP1, and the second repair line RP2.

A semiconductor layer SM is disposed on the gate insulating layer 112 and (completely) covers the gate electrode GE. In one or more embodiments, the semiconductor layer SM includes an active layer and an ohmic contact layer.

The source electrode SE and the drain electrode DE are disposed on the semiconductor layer SM and the gate insulating layer 112 and are spaced from each other. The drain electrode DE is formed by extending the first data line DL1 and overlaps the gate electrode GE, wherein the first data line DL1 overlaps the first repair line RP1. The source electrode SE is formed by extending the first source line SL1 and overlaps the gate electrode GE, wherein the first source line SL1 overlaps the second repair line RP2.

The semiconductor layer SM may form a conductive channel between the source electrode SE and the drain electrode DE when the gate electrode GE receives a gate signal.

Referring to FIG. 5, the second test part 20 includes a plurality of second-category test transistor (or second test transistors, for conciseness) T2_1 to T2_n, a second switching pad SP2, and a plurality of second-category test pads (or second test pads, for conciseness, including test pads PD3 and PD4).

Each gate electrode of the gate electrodes of the second test transistors T2_1 to T2_n is electrically connected to the second switching pad SP2. The drain electrodes of the second test transistors T2_1 to T2_n are electrically connected to the gate lines GL1 to GLn, respectively.

Each of the second test transistors T2_1 to T2_n is electrically connected to one of the second test pads PD3 and PD4. The source electrode of each of the second test transistors is electrically connected to a corresponding second test pad PD3 or PD4. In one or more embodiments, the second test transistors T2_1 to T2_n include a third sub-group (which is electrically connected to the test pad PD3) and a fourth sub-group (which is electrically connected to the test pad PD4). The third sub-group may include odd-numbered transistors T2_1, T2_3, ..., and T2_n-1 of the second test transistors T2_1 to T2_n, and the fourth sub-group may include the even-numbered transistors T2_2, T2_4, ..., and T2_n of the second test transistors T21 to T2_n.

The second test pads PD3 and PD4 include a test pad PD3 (which is electrically connected to the third sub-group) and a test pad PD4 (which is electrically connected to the fourth sub-group). The source electrodes of the second test transistors T2_1, T2_3, ..., and T2_n-1 (i.e., the third group) are electrically connected to the test pad PD3. The source electrodes of the second test transistors T2_2, T2_4, ..., and T2_n (i.e., the fourth sub-group) are electrically connected to the test pad PD4.

The gate lines GL1 to GLn include first-group gate lines (or first gate lines, for conciseness) GL1, GL3, ..., and GLn-1 respective representing odd-numbered gate lines GL1, GL3, ..., and GLn-1 and include second-group gate lines (or second gate lines, for conciseness) GL2, GL4, ..., and GLn respectively representing even-numbered gate lines GL2, GL4, ..., and GLn. The second gate lines GL2, GL4, ..., and GLn may be extended longer than the first gate lines GL1, GL3, ..., and GLn-1 in the fourth non-display area NDA4.

Each drain electrode of the second test transistors T2_1, T2_3, ..., and T2_n-1 (i.e., the third sub-group) is electrically connected to a corresponding first gate line of the first gate lines GL1, GL3, ..., and GLn-1. Each drain electrode of the second test transistors T2_2, T2_4, ..., and T2_n (i.e., the fourth sub-group) is electrically connected to a corresponding second gate line of the second gate lines GL2, GL4, ..., and GLn.

In one or more embodiments, as illustrated in FIG. 5, the second test transistors include two sub-groups respectively connected to the two second test pads PD3 and PD4. In one or more embodiments, the second test transistors include two or more sub-groups respectively connected to two or more second test pads. In one or more embodiments, all of the second test transistors may be electrically connected to a same second test pad.

Hereinafter, the open/short test and the visual test for the above-mentioned thin film transistor substrate 110 according to one or more embodiments will be described.

The open/short test is performed after the data lines DL1 to DLm have been formed. When the open/short test is performed, the first test part 10 disposed in the second non-display area NDA2 applies a first test signal to the data lines DL1 to DLm. In one or more embodiments, the first test signal is applied to the OS pads OSP1 to OSPm of the first test part 10. Accordingly, the first test signal is applied to the data lines DL1 to DLm electrically connected to the OS pads OSP1 to OSPm.

As described above, the data lines DL1 to DLm are electrically connected to the data pad parts DPD1 to DPDk in the first non-display area NDA1 opposite and parallel to the second non-display area NDA2. Thus, the first test signal applied to the data lines DL1 to DLm is output through the data pad parts DPD1 to DPDk. The output of the first test signal is detected from the data pad parts DPD1 to DPDk. Whether a data line of the data lines DL1 to DLm is open is determined based on the first test signal output from the corresponding data pad part of the data pad parts DPD1 to DPDk. In one or more embodiments, a data line that outputs (through a corresponding one of the data pad parts DPD1 to DPDk) a first detection signal in a predetermined normal range is deemed normal, and a data line that outputs (through a corresponding data pad part) a first detection signal beyond the normal range is deemed open.

After an open data line has been detected, the OS pad electrically connected to the open data line and the repair line overlapping the OS pad (which is electrically connected to the open data line) are welded with each other using a laser in an area in which the OS pad and the repair line overlap each other, as further described with reference to FIGS. 6 and 7.

When the visual test is performed on the thin film transistor substrate 110, a first switching signal is applied to the first test transistors T1_1 to T1_m through the first switching pad SP1, and a second switching signal is applied to the second test transistors T2_1 to T2_n through the second switching pad SP2. The first test transistors T1_1 to T1_m are turned on in response to the first switching signal, and the second test transistors T2_1 to T2_n are turned on in response to the second switching signal.

The second test signal (or a sub-test signal thereof) is applied to each of the second test pads PD3 and PD4. The turned-on second test transistors T2_1 to T2_n receive the second test signal through the second test pads PD3 and PD4. The second test signal is applied to each of the gate lines GL1 to GLn through a corresponding one of the turned-on second test transistors T2_1 to T2_n.

The second test signal includes a first sub-test signal applied to the test pad PD3 and includes a second sub-test signal applied to the test pad PD4. The first sub-test signal (or copies thereof) may be applied to the first gate lines GL1, GL3, ..., and GLn-1 electrically connected to the second test transistors T2_1, T2_3, ..., and T2_n-1 (i.e., the third sub-group). The second sub-test signal (or copies thereof) may be applied to the second gate lines GL2, GL4, ..., and GLn electrically connected to the second test transistors T2_2, T2_4, ..., and T2_n (i.e., the fourth sub-group).

The first sub-test signal and the second sub-test signal are different from each other and are applied to the third sub-group (i.e., the first gate lines GL1, GL3, ..., and GLn-1) and the fourth sub-group (i.e., the second gate lines GL2, GL4, ..., and GLn), respectively; therefore, short circuit between the third sub-group (i.e., the first gate lines GL1, GL3, ..., and GLn-1) and the fourth sub-group (i.e., the second gate lines GL2, GL4, ..., and GLn) may be detected.

The third test signal (or sub-test signals thereof) may be applied to the first test pads PD1 and PD2. The turned-on first test transistors T1_1 to T1_m receive the third test signal through the first test pads PD1 and PD2. The third test signal (or copies thereof) may be applied to the data lines DL1 to DLm through the turned-on first test transistors T1_1 to T1_m.

The third test signal includes a third sub-test signal applied to the first pad PD1 and includes a fourth sub-test signal applied to the second pad PD2. The third sub-test signal (or copies thereof) may be applied to the first data lines DL1, DL3, ..., and DLm-1 electrically connected to the first test transistors T1_1, T1_3, ..., and T1_m-1 (i.e., the first sub-group). The fourth sub-test signal (or copies thereof) may be applied to the second data lines DL2, DL4, ..., and DLm electrically connected to the first test transistors T1_2, T1_4, ..., and T1_m (i.e., the second sub-group).

The third sub-test signal and the fourth sub-test signal are different from each other and are applied to the first sub-group (i.e., the first data lines DL1, DL3, ..., and DLm-1) and the second sub-group (i.e., the second data lines DL2, DL4, ..., and DLn), respectively; therefore, short circuit between the first sub-group (i.e., the first data lines DL1, DL3, ..., and DLm-1) and the second sub-group (i.e., the second data lines DL2, DL4, ..., and DLm) may be detected.

The second test signal and the third test signal respectively applied to the gate lines GL1 to GLn and the data lines DL1 to DLm may form a resistance image in the display area DA of the thin film transistor substrate 110 (with the presence of the liquid crystal layer of the display device). The visual test is performed by observing the resistance image appeared in the display area DA of the thin film transistor substrate 110 using the test camera and by comparing the observed resistance image with a predetermined resistance image.

If the OS pads OSP1 to OSPm (used for the open/short test) did not overlap the first switching transistors T1_1 to T1_m (used for the visual test) (in the row direction), and/or if the OS pads OSP1 to OSPm did not overlap the repair lines RP1 and RP2 (in a direction perpendicular to the thin film transistor substrate 110), additional areas might be required to accommodate the OS pads OSP1 to OSPm and the first switching transistors T1_1 to T1_m.

According to one or more embodiments of the invention, the OS pads OSP1 to OSPm (used for the open/short test) may overlap the first switching transistors T1_1 to T1_m (used for the visual test) (in the row direction), and/or the OS pads OSP1 to OSPm may overlap the repair lines RP1 and RP2 (in a direction perpendicular to the thin film transistor substrate 110). Accordingly, the size of the first test part 10 may be minimized, and the second non-display area NDA2 of the thin film transistor substrate 110 may be efficiently used. As a result, the total size of the non-display area may be advantageously minimized. In addition, welding between the OS pads and the repair lines RP1 and RP1 may be simplified, such that repair efficiency may be maximized.

Figure 6:
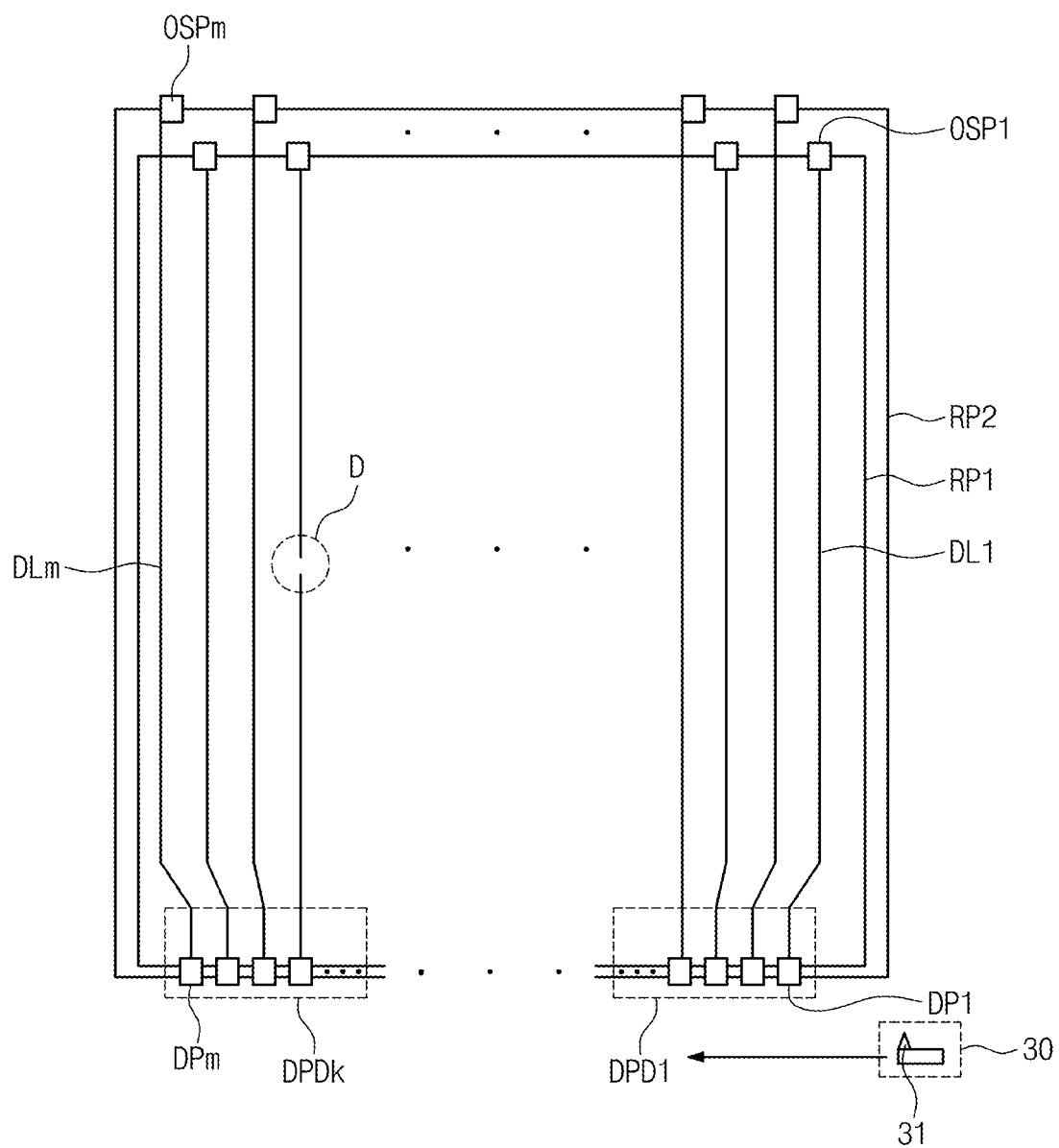
FIG. 6 is a view for explaining an open/short test method.

FIG. 6 is a view for explaining the open/short test method. For convenience of explanation, some of the data lines DL1 to DLm, some of the data pad parts DPD1 to DPDk, some of the OS pads OSP1 to OSPm, and the repair lines RP1 and RP2 have been illustrated in FIG. 6.

Referring to FIG. 6, each of the data pad parts DPD1 to DPDk includes a plurality of data pads; the data pad parts DPD1 to DPDk include data pads DP1 to DPm. Each of the data pads DP1 to DPm is electrically connected to a corresponding data line of the data lines DL1 to DLm. First ends of the data lines DL1 to DLm are electrically connected to the data pads DP1 to DPm in the first non-display area NDA1, respectively, and second ends of the data lines DL1 to DLm are electrically connected to the OS pads OSP1 to OSPm in the second non-display area NDA2, respectively.

The open/short test is performed after the data lines DL1 to DLm are formed on the thin film transistor substrate 110. When the open/short test is performed, a copy of the first test signal is applied to each of the OS pads OSP1 to OSPm, so that the test signal is applied to the data lines DL1 to DLm electrically connected to the OS pads OSP1 to OSPm.

A detecting device 30 may be configured to sequentially overlap (e.g., in a column direction or in a direction perpendicular to the thin film transistor substrate), sequentially contact, and/or may be sequentially electrically connected to the data pads DP1 to DPm. The detecting device 30 includes a probe 31. In one or more embodiments, the probe 31 may move (e.g., fall down (because of attraction and/or gravity) to contact the first data pad DP1, thereby applying a predetermined pressure to the first data pad DP1. In one or more embodiments, after the probe 31 has contacted the first data pad DP1, the detecting device 30 may move (e.g., fall down) toward the first data pad DP1, wherein the distance of the further fall may be about 200 micrometers from the initial contact position of the detecting device 30 where the probe 31 initially contacts the first data pad DP1. The movement of the detecting device 30 toward the first data pad DP1 may increase the pressure applied to the first data pad DP1; as a result, a contact force (e.g., a repelling force) between the probe 31 and the first data pad DP1 may increase. The contact force may enable the detecting device 30 to move from the first data pad DP1 to the second data pad DP2. Analogous contact forces may enable the detecting device 30 to move from data pad to the data pad, toward the m-th data pad DPm, at a speed of about 100 mm/s, so that the probe 31 of the detecting device 30 may sequentially contact and/or may be electrically connected to the data pads DP1 to DPm.

If the detecting device 30 moves from a probe 31 contact position to the m-th data pad DPm by a distance greater than about 200 micrometers and contacts the first data pad DP1, a scratch may occur on the m-th data pad DPm. Therefore, the movement of the detecting device 30 toward a data pad (for increasing the contact force) may have a distance value that is equal to or smaller than about 200 micrometers.

The detecting device 30 may detect the first test signal output from the data pads DP1 to DPm. If the first test signal is normally output through a data pad of the data pads DP1 to DPm, the data line that is electrically connected to the data pad is determined to be normal. If a data line has an open portion D, the first test signal is not normally output from the data pad connected to data line with the open portion D. Accordingly, the data line electrically connected to the data pad that does not normally output the first test signal is determined to be a defective data line.

Figure 7:
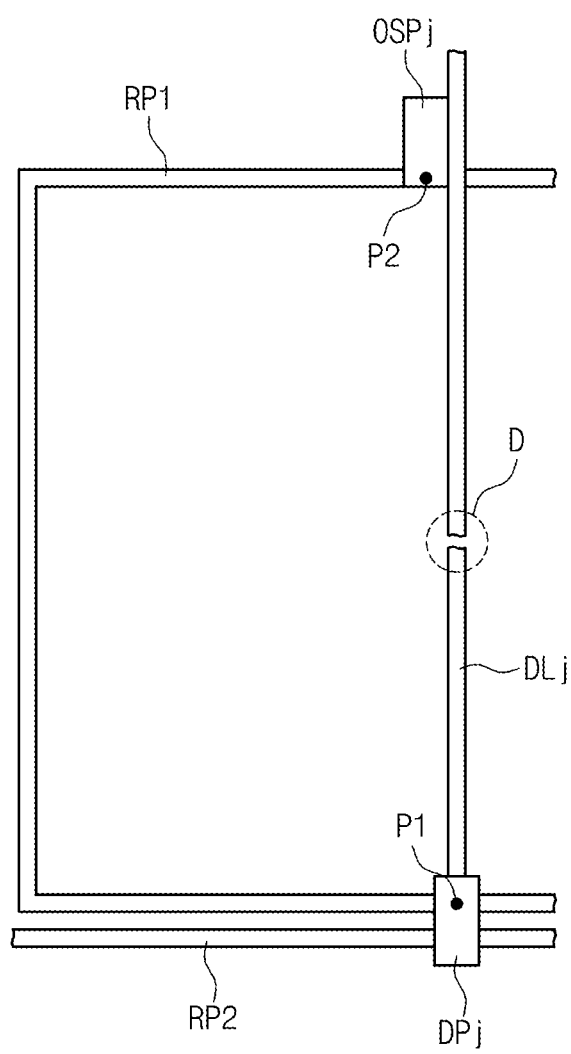
FIG. 7 is a view for explaining a repair method of repairing a data line that is open as indicated by a result of the open/short test method.

FIG. 7 is a view for explaining a repair method of repairing the data line that is open as indicated by the open/short test method. For convenience of explanation, the open data line DLj, the OS pad OSPj and the data pad DPj (each being connected to an end of the open data line DLj), and the first repair line RP1 have been illustrated in FIG. 7.

Referring to FIG. 7, the data line DLj in which the open portion D exists is determined to be a defective data line as a result of the open/short test.

A first portion of the first repair line RP1 overlaps the data pad DPj, which is connected to one end of the data line DLj. An area in which the first repair line RP1 and the data pad DPj overlap each other is referred to as a first welding portion P1.

A second portion of the first repair line RP1 overlaps the OS pad OSPj, which is connected to the other end of the data line DLj. An area in which the first repair line RP1 and the OS pad OSPj overlap each other is referred to as a second welding portion P2.

One or more laser beams are irradiated onto the first welding portion P1 and the second welding portion P2. The data pad DPj is welded with the first portion of the first repair line RP1 at the first repair portion P1, and the OS pad OSPj is welded with the second portion of the first repair line RP1 at the second repair portion P2.

The source driver chips are disposed on the data pad parts DPD1 to DPDk and the data voltages are applied to the data lines DL1 to DLm from the source driver chips. A data voltage is applied to the data pad DPj, which is connected to the one end of the data line DLj that is open. In addition, the data voltage is applied to the OS pad OSPj connected to the other end of the data line DLj, which is open, through the first repair line RP1, which is connected to the data pad DPj. Since the data voltage is applied to the upper and lower portions of the open data line DLj, the pixels of the display area DA may be normally operated.

In one or more embodiments, the thin film transistor substrate 110 may be unlikely to have more than two open data lines; therefore, the thin film transistor substrate may include no more than two repair lines RP1 and RP2. In one or more embodiments, the thin film transistor substrate 110 may include more than two repair lines. A number of data lines corresponding to the number of the repair lines may be repaired.

Figure 8:
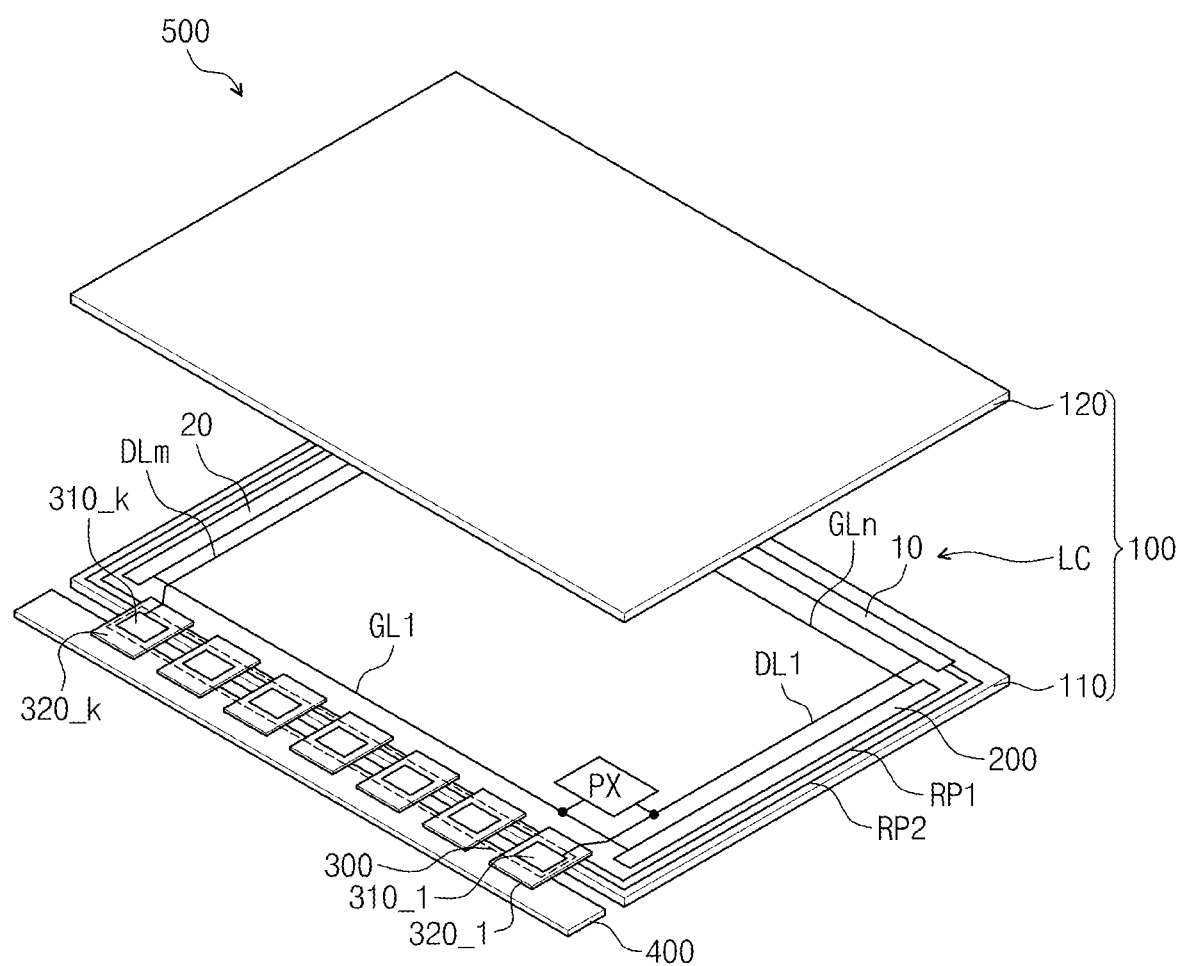
FIG. 8 is a perspective view illustrating a liquid crystal display that includes the thin film transistor substrate illustrated in FIG. 1.

FIG. 8 is a perspective view illustrating a liquid crystal display 500 that includes the thin film transistor substrate 110 illustrated in FIG. 1. For the convenience of explanation, FIG. 8 illustrates only one pixel PX.

Referring to FIG. 8, the liquid crystal display 500 includes a display panel 100, a gate driver 200, a data driver 300, and a driving circuit board 400.

The display panel 100 includes the thin film transistor substrate 110 in which the pixels PX are arranged, a color filter substrate 120 overlapping the thin film transistor substrate 110 and including a common electrode (not illustrated), and a liquid crystal layer LC interposed between the thin film transistor substrate 110 and the color filter substrate 120. Each pixel PX is connected to a corresponding gate line of the gate lines GL1 to GLn and a corresponding data line of the data lines DL1 to DLm.

The thin film transistor substrate 110 includes a plurality of pixel electrodes (not illustrated) respectively corresponding to the pixels and a plurality of thin film transistors (not illustrated) each being connected to a corresponding pixel electrode of the pixel electrodes. Each thin film transistor receives the data voltage provided through the corresponding data line in response to the gate signal provided through the corresponding gate line. The data voltages are applied to the pixel electrodes.

The gate driver 200 generates the gate signals in response to a gate control signal provided from a timing controller (not illustrated) mounted on the driving circuit substrate 400. The gate signals are sequentially applied to the pixels in the unit of row.

The data driver 300 receives image signals and a data control signal from the timing controller. The data driver 300 generates analog data voltages corresponding to the image signals in response to the data control signal. The data driver 300 applies the data voltages to the pixel PX through the data lines DL1 to DLm. The data driver 300 includes a plurality of source driver chips 310_1 to 310_k. The source driver chips 310_1 to 310_k are respectively mounted on the flexible printed circuit boards 320_1 to 320_k and connected between the driving circuit board 400 and the data pad parts DPD1 to DPDk of the first non-display area NDA1 illustrated in FIG. 1.

Although not illustrated in figures, the flexible printed circuit boards 320_1 to 320_k, on which the source driving chips 310_1 to 310_k are mounted, may be respectively connected to the data pad parts DPD1 to DPDk using an anisotropic conductive film.

In one or more embodiments, the source driver chips 310_1 to 310_k are mounted on the flexible printed circuit boards 320_1 to 320_k by a tape carrier package (TCP) method. In one or more embodiments, the source driver chips 310_1 to 310_k may be mounted in the first non-display area NDA1 by a chip-on-glass (COG) method.

The configuration of the thin film transistor substrate 110 may be analogous to one or more configurations discussed with reference to FIGS. 1 to 7.

Although not illustrated in figures, color filters are formed on the color filter substrate 120. The color filter includes color pixels for displaying red, green, and blue colors. In addition, although not illustrated in figures, the liquid crystal display 500 includes a backlight unit configured to supply light to the display panel 100. The backlight unit may include a direct-illumination type backlight unit disposed under the display panel 100 and/or an edge-illumination type backlight unit disposed adjacent to a side portion of the display panel 100.

When the data voltages are applied to the pixel electrodes by the thin film transistors and the common voltage is applied to the common electrode, the arrangement of the liquid crystal molecules of the liquid crystal layer LC are changed. The transmittance of the light provided from the backlight unit is changed in accordance with the changed arrangement of the liquid crystal molecules, thereby enabling the display panel 100 to display the desired image.

The first test part 10 disposed in the second non-display area NDA2 of the thin film transistor substrate 110 does not include additional pads connected to the data lines DL1 to DLm other than the OS pads OSP1 to OSPm, which are used to perform the open/short test. The OS pads OSP1 to OSPm of the first test part 10 may overlap the repair lines RP1 and RP2 and may overlap the first switching transistors T1_1 to T1_m. One of the repair lines RP1 and RP2 may be connected to one of the OS pads that is connected to an open data lines through a welding process.

Accordingly, the size of the first test part 10 may be minimized, the second non-display area NDA2 of the thin film transistor substrate 110 may be efficiently used. Advantageously, the total size of the non-display area may be minimized.

Although embodiments of the present invention have been described, the present invention should not be limited to these embodiments. Various changes and modifications can be made by one ordinary skilled in the art within the spirit and scope of the present invention as hereinafter claimed.

What is claimed is:

1. A thin film transistor substrate comprising:
 a display area that includes a plurality of pixels connected to gate lines and data lines crossing the gate lines;
 a non-display area disposed in the vicinity of the display area;
 a plurality of data pads disposed in the non-display area and each being connected to a first end of a corresponding data line of the data lines;
 a plurality of first transistors disposed in the non-display area and each being connected to a second end of the corresponding data line of the data lines;
 a plurality of OS pads connected to the second end of the data lines; and
 a plurality of repair lines disposed in the non-display area along a vicinity of the display area and arranged while interposing the first transistors therebetween, wherein the OS pads are overlapped with the first transistors and the repair lines.

2. The thin film transistor substrate of claim 1, wherein the non-display area comprises:
 a first non-display area disposed adjacent to a lower side of the display area and including the data pads disposed therein;
 a second non-display area disposed adjacent to an upper side of the display area and including the OS pads and the first transistors disposed therein;
 a third non-display area disposed adjacent to a right side of the display area; and
 a fourth non-display area disposed adjacent to a left side of the display area.

3. The thin film transistor substrate of claim 2, wherein the data lines comprise:
 first data lines corresponding to odd-numbered data lines of the data lines; and
 second data lines corresponding to even-numbered data lines of the data lines, and the second data lines are extended longer than the first data lines in the second non-display area.

4. The thin film transistor substrate of claim 3, wherein the repair line comprises:
 a first repair line; and
 a second repair line disposed at a position outer than the first repair line, and the first transistors are disposed between the first repair line and the second repair line.

5. The thin film transistor substrate of claim 4, further comprising:
 a first test gate line disposed between the first and second repair lines in the second non-display area to be connected to the first transistors;
 a first switching pad connected to the first test gate line; and
 a plurality of first test pads connected to the first transistors, wherein the first transistors are divided into first groups respectively corresponding to the first test pads, and the first transistors arranged in the same first group are commonly connected to a corresponding first test pad of the first test pads.

6. The thin film transistor substrate of claim 5, wherein each of the first transistors comprises:
 a gate electrode connected to the first test gate line;
 a drain electrode connected to the corresponding data line; and
 a source electrode connected to the corresponding first test pad, and the source electrodes of the first transistors arranged in the same first group are commonly connected to the corresponding first test pad.

7. The thin film transistor substrate of claim 5, wherein the first data lines are overlapped with the first test gate line and the first repair line and the second data lines are overlapped with the first repair line, the first test gate line, and the second repair line.

8. The thin film transistor substrate of claim 5, wherein the first and second repair lines, the first test gate line, and the gate lines are disposed on a same layer and substantially simultaneously formed.

9. The thin film transistor substrate of claim 5, wherein the OS pads connected to the second end of the first data lines are overlapped with the first repair line and the first test gate line, and the OS pads connected to the second end of the second data lines are overlapped with the first test gate line and the second repair line.

10. The thin film transistor substrate of claim 2, further comprising:
a gate driver disposed in the third non-display area to be connected to the gate lines;
a plurality of second transistors each connected to a corresponding gate line of the gate lines in the fourth non-display area;
a second switching pad connected to the second transistors; and
a plurality of second test pads connected to the second transistors, wherein the second transistors are divided into second groups respectively corresponding to the second test pads, and the second transistors arranged in the same second group are commonly connected to a corresponding second test pad of the second test pads.

11. The thin film transistor substrate of claim 10, wherein each of the second transistors comprises:
a gate electrode connected to the second switching pad;
a drain electrode connected to the corresponding gate line; and
a source electrode connected to the corresponding second test pad, and the source electrodes of the second transistors arranged in the same second group are commonly connected to the corresponding second test pad.

12. A liquid crystal display comprising:
a thin film transistor substrate that includes gate lines applied with gate signals, data lines applied with data voltages and crossing the gate lines, pixels connected to the gate lines and the data lines;
a gate driver that applies the gate signals to the pixels;
a data driver that applies the data voltages to the pixels;
a color filter substrate facing the thin film transistor substrate; and
a liquid crystal layer interposed between the thin film transistor substrate and the color filter substrate, the thin film transistor substrate comprising:
a display area that includes the pixels;
a non-display area disposed in the vicinity of the display area;
a plurality of data pads disposed in the non-display area and each being connected to a first end of a corresponding data line of the data lines and the data driver;
a plurality of first transistors disposed in the non-display area and each being connected to a second end of the corresponding data line of the data lines;
a plurality of OS pads connected to the second end of the data lines; and
a plurality of repair lines disposed in the non-display area along a vicinity of the display area and arranged while interposing the first transistors therebetween, wherein the OS pads are overlapped with the first transistors and the repair lines.

13. The liquid crystal display of claim 12, wherein the non-display area comprises:
a first non-display area disposed adjacent to a lower side of the display area and including the data pads disposed therein;
a second non-display area disposed adjacent to an upper side of the display area and including the OS pads and the first transistors disposed therein;
a third non-display area disposed adjacent to a right side of the display area and including the gate driver disposed therein; and
a fourth non-display area disposed adjacent to a left side of the display area.

14. The liquid crystal display of claim 13, wherein the data lines comprise:
first data lines corresponding to odd-numbered data lines of the data lines; and
second data lines corresponding to even-numbered data lines of the data lines, and the second data lines are extended longer than the first data lines in the second non-display area.

15. The liquid crystal display of claim 14, wherein the repair line comprises:
a first repair line; and
a second repair line disposed at a position outer than the first repair line, and the first transistors are disposed between the first repair line and the second repair line.

16. The liquid crystal display of claim 15, further comprising:
a first test gate line disposed between the first and second repair lines in the second non-display area to be connected to the first transistors;
a first switching pad connected to the first test gate line; and
a plurality of first test pads connected to the first transistors, wherein the first transistors are divided into first groups respectively corresponding to the first test pads, and the first transistors arranged in the same first group are commonly connected to a corresponding first test pad of the first test pads.

17. The liquid crystal display of claim 16, wherein each of the first transistors comprises:
a gate electrode connected to the first test gate line;
a drain electrode connected to the corresponding data line; and
a source electrode connected to the corresponding first test pad, and the source electrodes of the first transistors arranged in the same first group are commonly connected to the corresponding first test pad.

18. The liquid crystal display of claim 16, wherein the first data lines are overlapped with the first test gate line and the first repair line and the second data lines are overlapped with the first repair line, the first test gate line, and the second repair line.

19. The liquid crystal display of claim 16, wherein the OS pads connected to the second end of the first data lines are overlapped with the first repair line and the first test gate line, and the OS pads connected to the second end of the second data lines are overlapped with the first test gate line and the second repair line.

20. The liquid crystal display of claim 13, further comprising a plurality of second transistors, a second switching pad, and a plurality of second test pads, which are disposed in the fourth non-display area, wherein each of the second transistors comprises:
a gate electrode connected to the second switching pad;
a drain electrode connected to the corresponding gate line; and
a source electrode connected to the corresponding second test pad, the second transistors are divided into second groups corresponding to the second test pads, and the source electrodes of the second transistors arranged in the same second group are commonly connected to the corresponding second test pad.

* * * * *